United States Patent
Gorelick et al.

(10) Patent No.: US 9,524,280 B2
(45) Date of Patent: Dec. 20, 2016

(54) METHOD AND SYSTEM TO AUTOMATICALLY INSERT A RELEVANT HYPERLINK INTO A WEBPAGE

(75) Inventors: Richard B. Gorelick, New York, NY (US); Steven G. Madere, Austin, TX (US); Michael D. McCartney, Austin, TX (US); Matthew W. Mengerink, Austin, TX (US); David J. Wilson, Austin, TX (US)

(73) Assignee: eBay Inc., San Jose, CA (US)

( * ) Notice: Subject to any disclaimer, the term of this patent is extended or adjusted under 35 U.S.C. 154(b) by 1482 days.

(21) Appl. No.: 13/087,939

(22) Filed: Apr. 15, 2011

(65) Prior Publication Data

US 2011/0197115 A1 Aug. 11, 2011

Related U.S. Application Data

(63) Continuation of application No. 11/965,457, filed on Dec. 27, 2007, which is a continuation of application
(Continued)

(51) Int. Cl.
*G06F 17/24* (2006.01)
*G06Q 30/02* (2012.01)

(52) U.S. Cl.
CPC ......... *G06F 17/241* (2013.01); *G06Q 30/0251* (2013.01)

(58) Field of Classification Search
CPC ... G06F 17/24; G06F 17/3089; G06F 17/2247
(Continued)

(56) References Cited

U.S. PATENT DOCUMENTS

| 5,630,117 A | 5/1997 | Oren et al. |
| 5,634,121 A | 5/1997 | Tracz et al. |

(Continued)

FOREIGN PATENT DOCUMENTS

WO  WO-2007033037 A2  3/2007

OTHER PUBLICATIONS

"U.S. Appl. No. 09/734,045, Advisory Action mailed Feb. 8, 2005", 3 pgs.
(Continued)

*Primary Examiner* — Scott Baderman
*Assistant Examiner* — Seung Jung
(74) *Attorney, Agent, or Firm* — Schwegman, Lundberg & Woessner, P.A.

(57) ABSTRACT

A method and system to automatically insert a hyperlink into a webpage containing text is described. The system comprises at least one processor and at least one software component. The at least one software component is executable by the at least one processor to receive, via, a network, the text. The at least one software component further compares a portion of the text to at least one character string that is stored in a database to identify the portion of the text as included in both the webpage and the database. The portion of the text is a name of a product and is associated with the hyperlink. The at least one software component is further executable to cause an insertion of the hyperlink into the webpage and to communicate the name of the product to a producer of the text. The name of the product is included in the webpage by the producer of the portion of the text.

18 Claims, 5 Drawing Sheets

Related U.S. Application Data

No. 09/734,045, filed on Dec. 12, 2000, now Pat. No. 7,418,657.

(58) Field of Classification Search
USPC .......................................................... 715/205
See application file for complete search history.

(56) References Cited

U.S. PATENT DOCUMENTS

| | | | |
|---|---|---|---|
| 5,708,825 A | | 1/1998 | Sotomayor |
| 5,745,360 A | | 4/1998 | Leone et al. |
| 6,092,074 A | * | 7/2000 | Rodkin et al. ................ 715/205 |
| 6,122,647 A | | 9/2000 | Horowitz et al. |
| 6,211,877 B1 | | 4/2001 | Steele et al. |
| 6,546,399 B1 | | 4/2003 | Reed et al. |
| 6,612,501 B1 | | 9/2003 | Woll et al. |
| 6,651,058 B1 | | 11/2003 | Sundaresan et al. |
| 6,754,873 B1 | | 6/2004 | Law et al. |
| 6,862,710 B1 | * | 3/2005 | Marchisio ..................... 715/206 |
| 6,877,137 B1 | | 4/2005 | Rivette et al. |
| 7,003,719 B1 | * | 2/2006 | Rosenoff et al. ............. 715/205 |
| 7,032,168 B1 | | 4/2006 | Gerace et al. |
| 7,418,657 B2 | | 8/2008 | Gorelick et al. |
| 7,421,432 B1 | * | 9/2008 | Hoelzle et al. |
| 2001/0020244 A1 | | 9/2001 | Belanger et al. |
| 2001/0044825 A1 | | 11/2001 | Barritz |
| 2001/0047413 A1 | * | 11/2001 | Landau et al. ................ 709/225 |
| 2001/0054084 A1 | | 12/2001 | Kosmynin |
| 2002/0032698 A1 | | 3/2002 | Cox |
| 2002/0037104 A1 | | 3/2002 | Myers et al. |
| 2002/0056097 A1 | | 5/2002 | Marion et al. |
| 2002/0069222 A1 | | 6/2002 | McNeely |
| 2008/0104073 A1 | | 5/2008 | Gorelick et al. |
| 2011/0196738 A1 | | 8/2011 | Gorelick et al. |

OTHER PUBLICATIONS

"U.S. Appl. No. 09/734,045, Advisory Action mailed Mar. 15, 2006", 3 pgs.
"U.S. Appl. No. 09/734,045, Appeal Brief filed Apr. 27, 2006", 17 pgs.
"U.S. Appl. No. 09/734,045, Final Office Action mailed Oct. 14, 2004", 9 pgs.
"U.S. Appl. No. 09/734,045, Final Office Action mailed Dec. 27, 2005", 9 pgs.
"U.S. Appl. No. 09/734,045, Non Final Office Action mailed Feb. 23, 2004", 9 pgs.
"U.S. Appl. No. 09/734,045, Non Final Office Action mailed Jun. 15, 2005", 9 pgs.
"U.S. Appl. No. 09/734,045, Notice of Non-Compliant Amendment mailed Nov. 21, 2006", 2 pgs.
"U.S. Appl. No. 09/734,045, Notice of Non-Compliant Appeal Brief mailed Jul. 14, 2006", 2 pgs.
"U.S. Appl. No. 09/734,045, Preliminary Amendment filed Mar. 28, 2005", 7 pgs.
"U.S. Appl. No. 09/734,045, Response filed Jan. 14, 2005 to Final Office Action mailed Oct. 14, 2004", 7 pgs.
"U.S. Appl. No. 09/734,045, Response filed Feb. 27, 2006 to Final Office Action mailed Dec. 27, 2005", 5 pgs.
"U.S. Appl. No. 09/734,045, Response filed May 28, 2004 to Non Final Office Action mailed Feb. 23, 2004", 11 pgs.
"U.S. Appl. No. 09/734,045, Response filed Aug. 14, 2006 to Notice of Non-Compliant Appeal Brief mailed Jul. 14, 2006", 4 pgs.
"U.S. Appl. No. 09/734,045, Response filed Oct. 11, 2005 to Non Final Office Action mailed Jun. 15, 2005", 8 pgs.
"U.S. Appl. No. 09/734,045, Response filed Dec. 11, 2006 to Notice of Non-Compliant Amendment mailed Nov. 21, 2006", 4 pgs.
"U.S. Appl. No. 09/734,045, Supplemental Response filed Sep. 8, 2006 to Notice of Non-Compliant Appeal Brief mailed Jul. 14, 2006", 4 pgs.
Kanada, Y., "Axis-specified Search: A Fine-grained Full-text Search Method for Gathering and Structing Excerpts", Proceedings of the third ACM Conference on Digital Libraries, (May 1998), 108-117.
Marshall, Matt, "Gee-whiz Web firms sprouting like it's '99", Mercury News—San Jose, (Oct. 6, 2005), 1-2.
"U.S. Appl. No. 09/734,045, Notice of Allowance mailed May 14, 2008", 6 pgs.
"U.S. Appl. No. 11/965,457, Final Office Action mailed Jan. 27, 2011", 13 pgs.
"U.S. Appl. No. 11/965,457, Final Office Action mailed Dec. 4, 2013", 11 pgs.
"U.S. Appl. No. 11/965,457, Non Final Office Action mailed May 28, 2013", 12 pgs.
"U.S. Appl. No. 11/965,457, Non-Final Office Action mailed Jun. 16, 2010", 10 pgs.
"U.S. Appl. No. 11/965,457, Response filed Mar. 4, 2014 to Final Office Action mailed Dec. 4, 2013", 10 pgs.
"U.S. Appl. No. 11/965,457, Response filed Jun. 27, 2011 to Final Office Action mailed Jan. 27, 2011", 10 pgs.
"U.S. Appl. No. 11/965,457, Response filed Aug. 23, 2013 to Non Final Office Action mailed May 28, 2013", 10 pgs.
"U.S. Appl. No. 11/965,457, Response filed Oct. 18, 2010 to Non Final Office Action mailed Jun. 16, 2010", 8 pgs.
"U.S. Appl. No. 13/088,266, Examiner Interview Summary mailed Aug. 25, 2014", 3 pgs.
"U.S. Appl. No. 13/088,266, Non Final Office Action mailed Apr. 1, 2014", 17 pgs.
"U.S. Appl. No. 13/088,266, Response filed Aug. 1, 2014 to Non Final Office Action mailed Apr. 1, 2014", 15 pgs.
"U.S. Appl. No. 11/965,457, Non Final Office Action mailed Apr. 9, 2015", 13 pgs.
"U.S. Appl. No. 13/088,266, Examiner Interview Summary filed Sep. 25, 2014", 1 pg.
"U.S. Appl. No. 13/088,266, Examiner Interview Summary mailed May 29, 2015", 3 pgs.
"U.S. Appl. No. 13/088,266, Final Office Action mailed Oct. 24, 2014", 15 pgs.
"U.S. Appl. No. 13/088,266, Non Final Office Action mailed Mar. 25, 2015", 15 pgs.
"U.S. Appl. No. 13/088,266, Response filed Feb. 24, 2015 to Final Office Action maield Oct. 24, 2015", 14 pgs.

* cited by examiner

*FIG. 5*

METHOD AND SYSTEM TO AUTOMATICALLY INSERT A RELEVANT HYPERLINK INTO A WEBPAGE

RELATED APPLICATION

The present patent application is a continuation of U.S. patent application Ser. No. 11/965,457 filed Dec. 27, 2007, which is a continuation of U.S. patent application Ser. No. 09/734,045 filed Dec. 12, 2000, now issued as U.S. Pat. No. 7,418,657, all of which are incorporated herein by reference.

FIELD OF THE INVENTION

The present invention relates to a method for automatically inserting relevant hyperlinks into a webpage that is transmitted and displayed on the Internet.

BACKGROUND OF THE INVENTION

It is well known for a user to access textual information through a host on a communication network. This process 10 is summarized in FIG. 1. The method begins by establishing a connection between the host and the user, step 20. Generally, the host resides on a "server" and the user accesses the host from a "client." The Client-Server paradigm is a model of interaction in a distributed communication system in which a program at one site sends a request to a program at another site and waits for a response. The requesting program is called the client, and the program responding to the request is called the server. In the context of the World Wide Web (discussed below), the client is a "Web browser," or simply "browser," which runs on a computer of the user. The program that responds to browser requests by serving Webpages is commonly referred to as a "Web server."

As part of the connection, the host includes a Web site, a computer system that serves informational content over a network using standard protocols. Typically, a site corresponds to a particular Internet domain name, such as "www.Deja.com," and includes the content associated with a particular organization. As used in the present invention, the term website is generally intended to encompass both (i) the hardware/software server components that serve the informational content over the network, and (ii) the "back end" hardware/software components, including any non-standard or specialized components, that interact with the server components to perform services for users of the Web site.

Once the connection is established in step 20, the host and the user interact over a distributed network, such as the Internet. The Internet is a collection of interconnected (public and/or private) networks that are linked together over various communication mediums by a set of standard protocols, such as TCP/IP and HTTP (discussed below), to form a global, distributed network. It should be appreciated that, white the term Internet generally used to refer to what is now commonly known as the World Wide Web, it also encompasses other forms of data transfer and is intended herein to equally apply equally to variations that may be made in the future, including changes and additions to existing standard protocols.

An important segment of the Internet is the World Wide Web ("Web"). The Web is used herein to refer generally to both (i) a distributed collection of interlinked, user-viewable hypertext documents (commonly referred to as Web documents or Webpages) that are accessible via the Internet, and (ii) the client and server software components which provide user access to such documents using standardized Internet protocols. Currently, the primary standard protocol for allowing applications to locate and acquire. Web documents is Hypertext Transfer Protocol "HTTP"), and the Webpages are encoded using Hyper-Text Markup Language ("HTML"). However, the terms, Web and "World Wide Web," are intended to encompass future markup languages and transfer protocols that may be used in place of (or in addition to) Extended Markup Language ("XML"), HTML, and HTTP.

HTTP is the standard World Wide Web client-server protocol used for the exchange of information, such as HTML documents and client requests for such documents, between a browser and a Web server. HTTP includes a number of different types of messages which can be sent from the client to the server to request different types of server actions. For example, a "GET" message, which has the format GET:Uniform Resource Locator ("URL"), causes the server to return the document or file located at the specified URL.

HTML is a standard coding convention and set of codes for attaching presentation and linking attributes to informational content within documents. HTML 4.0 is currently the primary standard used for generating Web documents. During a document authoring stage, the HTML codes (referred to as "tags") are embedded within the informational content of the document.

In particular, after establishing a connection, the user forwards to the host a request for information, step 30. Using HTTP, this request is usually in the form of getting a document located at a URL. A URL is a unique address which fully specifies the location of a file or other resource on the Internet. The general format of a URL is "Protocol:// machine_address:port/path/filename." The port specification is optional, and if none is entered by the user, the browser defaults to the standard port for the service that is specified as the protocol. For example, if HTTP is specified as the protocol, the browser will use the HTTP default port of 80.

After receiving the request from the host, the host serves to the customer's computer the requested text, step 40. The text files are generally written in HTML, and when the documents are transferred from the host server to the user client, the codes are interpreted by the browser and used to parse and display the text. In addition to specifying how the Web browser is to display the document, HTML tags can be used to create links to other Web documents or sites (the tags are commonly referred to as "hyperlinks"). A hyperlink is a navigational link from one document to another, or from one portion (or component) of a document to another. Typically, a hyperlink is displayed as a highlighted word or phrase that can be selected by clicking on it using a pointing device or a mouse to jump to the associated document or document portion. A set of hyperlinks is combined to form a hypertext system, a computer-based informational system in which documents (and possibly other types of data entities) are linked together via hyperlinks to form a user-navigable web.

A system for implementing the method 10 is illustrated in FIG. 2. A user's computer (client) 100 connects to the Internet 110, generally through a dial-up Internet Service Provider ("ISP"). A web browser 105 is contained on the client 100. The client 100 contacts a host server 120 storing a desired document (webpage) 125 through the Internet 110 and established connection 130. As previously described, HTTP is used to administer the transfer of information through the connection 130. In particular, the host server 120 receives a request for the webpage 125 from an input device 101 connected to the client 100. The host server responds by serving the requested webpage 125 to the client 100 for display on a connected display device 102.

There are several known methods for placing the webpage 125 onto the host server 120. For example, host personnel may manually program the contents of the webpage. However, this process is time consuming and relatively expensive because of the cost for the programmers. It is therefore desirable for the host to automatically find the contents of the webpage from a secondary source.

For example, it is well known for a host to load a document from a second server. In effect, the host acts as a client and requests information from the secondary source. For example, as illustrated in FIG. 2, a host server 120 may establish a connection 130' to a second server 120' using HTTP. Once the connection 130 is established, the host sends a request for information 135 contained on the second server. In response, the second server serves the information 135 to the host server 120. The host server 120 transforms the information 135 as needed and stores it as host webpage 125. The second sever may make the contents of the information 135 publicly available for use or may charge a fee to the host server. This arrangement is similar to news reporting services that publish and license news articles for used by newspapers around the country.

In an alternative method to easily form webpages, the host uses online news messages ("articles") to provide content. Online articles are public communications and, thus, available for viewing by any user in a network. This feature allows a sender of the article to reach numerous other users. For example, the sender can request information without knowing a specific source for the information. In particular, the contents of articles are placed at locations called newsgroups for public viewing.

The Usenet news system supports thousands of different newsgroups. Each newsgroup is identified by a newsgroup name that identifies the topic of discussion carried on the newsgroup. Newsgroups are available for a vast array of different topics ranging from business technology to cooking. A user may simultaneously post an article to one or more newsgroups. The article is then distributed to news servers throughout the Internet so it can be accessed by other users. An article is a text message often with attachments such as pictures, audio segments or some other binary data. A group of computers that exchange news articles is called a news network. The largest and best known news network is the Usenet, which is carried through the Internet. The Usenet is not a physical network, hut a logical network implemented on top of many different types of physical networks, such as the Internet, as illustrated in FIG. 3. The news servers are organized into a logical network across the Internet, feeding news articles to each other. In particular, computers on the Internet exchange news using software which follows Network News Transfer Protocol ("NNTP"), NNTP is an application protocol, as described in Request for Comment (RFC) 977, used for the distribution, inquiry, retrieval, and article of news articles using a reliable stream-based protocol, such as Transmission Control Protocol (TCP). TCP is described in RFC 793. News articles use various header fields as documented in RFC 1036. News servers may be implemented in various ways, for example, InterNetNews (INN) is a popular UNIX news server application.

As illustrated in FIG. 3, news articles are distributed via the news servers operated by Internet service providers, schools, universities, and companies. There is no central server on the Usenet. Instead, news servers are organized into a "store and forward" network. When a client posts an article, a news server stores a copy and forwards the article to a configurable set of news servers. These news servers, upon receiving an article from another news server, store a copy if the article was not previously stored and forward the article to other news servers so that eventually an article is forwarded to all the news servers.

News servers make arrangements among themselves to specify which newsgroups they exchange. The "receiving" server tells the "sending" server which newsgroups it wants to receive, and the sending server is configured to send only the specified newsgroups. Servers typically send articles to other servers more or less in the order of arrival. However, this sequence can become scrambled for various reasons, and as a result, a server commonly receives follow-on articles before the original article.

There are two known techniques for preventing the article from being redelivered to the same news server, and servers usually use both of these methods in sequence. In the first technique, the transferred articles contain a "Path:" header line that records the news servers that the article has traveled through between the originating server and the current server. If the receiving server already appears in the "Path:" line, the sending server does not try to send the article because the article has already passed through the receiving server. In the second technique for preventing the resending of an article, the servers use a "Message-ID:" header line in the article that contains an identifying code that is unique for each article. In particular, before transmitting the article, the sending server asks the receiving server, in effect, "Has the article with the Message-ID already been received." The receiving server responds either "No, please send a copy," or "Yes, already received so do not send it," whereby the sending server only sends the article if it is not already received by the receiving server.

Eventually, most servers that carry the newsgroup have a copy of the article, and ideally, an article to a newsgroup travels to all sites (news servers) that carry the newsgroup. The final result is that tens or hundreds of thousands of copies of the article will be present on news servers scattered all over the globe.

"News clients" or "newsreaders" communicate with the news server, via NNTP. Many news clients, such as Microsoft Internet News®, Microsoft Outlook Express® and Netscape Communicator's Collabra® application are commercially available.

By accessing the Usenet, the host 120 may act as a news client to subscribe and collect news articles. The news articles are public-domain and may be freely used and modified. The host 120 displays the article to users throughout a distributed information network, such as the Internet. The host may then become a portal through which a user may access the Usenet without the use of a news server.

In particular, the host adapts the contents of the articles for use over the Internet. In this process, the host converts the news to HTML format for transfer via HTTP to the client. This procedure is relatively simple because the articles are in text format and can be readily used in an HTML document. Typically, the host serves to a user an HTML page with an open area or box reserved for the contents of the article. The HTML page further contains a command to access and display the contents of the article. The HTML command "HFER" (hypertext reference) allows the webpage to access a specified document. For example, the command, "HFER=/www.site.com/id=x," allows the HTML page to access the contents of the document number x stored at the server at the URL, www.site.com.

Thus, a host may employ several techniques to create or obtain text to display to users. Once the host has the text, it is known to automatically insert hyperlinks with the text. For example, it is common to provide advertisements around the text that link users to sponsors of the host site. Similarly, the webpage generally contains links around the text that direct the user to other parts of the website. However, these automatically inserted links have little relevance to the specific contents of the text and are displayed regardless of the contents of the text. The disadvantage of the unrelated links is that they are of little interest to the user and can be easily ignored. For example, a website could simultaneously display a criticism of a product adjacent to an advertisement for the same product.

Furthermore, by providing relevant links, the host encourages users to access information and features because the user will naturally wish to access the linked page if the page is related to a subject of interest to the user. If irrelevant links are provided, the user may become frustrated and avoid using the links, even if some of the links direct the user to highly helpful sites.

While the host personnel may manually insert hyperlinks into a webpage according to the contents of the text, this process is time consuming and relatively expensive because of the cost of labor for the programmers.

Thus there exists a current need for a method to identify the subject of the text in a webpage and to automatically insert relevant links into the text without requiring extensive reprogramming of the page. In this way, the host integrates the text with the other contents of the host site by inserting relevant hyperlinks that interconnect the related contents of the site. This design allows a user to more easily identify and access the relevant contents of the host site by selecting links, thus facilitating a user's access to other information and features contained on the host site. Similarly, the host site may alert a user of newly available features or products, by linking to them from popularly accessed webpages of relevant text.

The host may also wish to modify the text to promote other relevant websites. In particular, the host may wish to direct users by linking to the site of a relevant sponsor, such as a manufacturer or a vendor of products of interest to the user. A link should only connect to sponsors of interest to the user. By better targeting users, the host site may increase advertising revenues.

Furthermore, by linking to relevant webpages, the host may create associations with certain topics or products. For example, a host that provides information on music products and links to related music vendors sites may become a primary portal through which buyers access music related information and products.

SUMMARY OF THE INVENTION

In view of the identified current need, it is an object of the present invention to provide a methodology through which a host site may automatically insert relevant links into a set of text. In this methodology, the contents of the text are compared against a database containing character strings, and character strings from the database contained in the text are identified. Each of the character strings in the database has an associated hyperlink that allows users to connect to other pages on the same website or other websites. For each character string of the database found in the contents of the text, the associated link is inserted into the text. In this way, only relevant links are inserted into the text.

BRIEF DESCRIPTION OF THE DRAWINGS

These and other features and advantages of the invention will now be described with reference to the drawings in which like number refer to like elements and in which:

FIG. 5 is an illustrative image of a webpage formed in accordance with the method of FIG. 4.

DETAILED DESCRIPTION OF THE PREFERRED EMBODIMENTS

Figure 4:
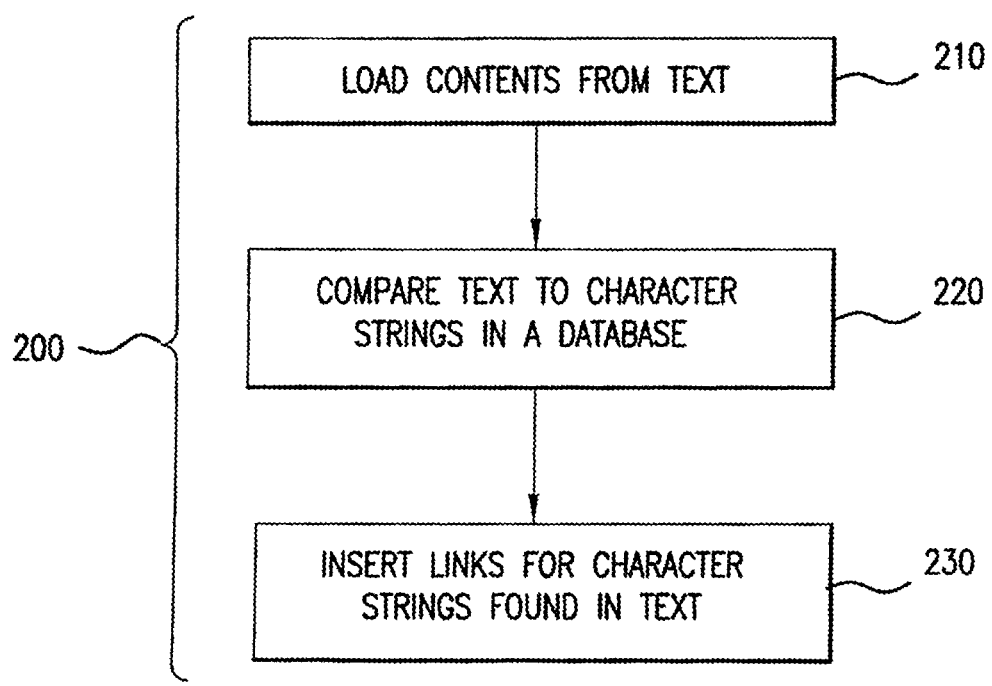
FIG. 4. is a flowchart illustrating the method according to one preferred embodiment of the present invention for automatically inserting relevant links into a webpage.

The present invention provides a method 200 for automatically inserting hyperlinks into text contained in a webpage, as illustrated in FIG. 4. In illustrated method 200, the first step 210 is to load into memory, such as a buffer, the contents from the text. Then, in the second step 220, the contents of the text are compared to character strings contained in a database in order to identify which, if any, of the character strings appears in the text. Each of the character strings has an associated hyperlink, and for each of the identified character strings contained in the text, the associated hyperlink is inserted in the contents of the webpage, step 230.

Figure 1:
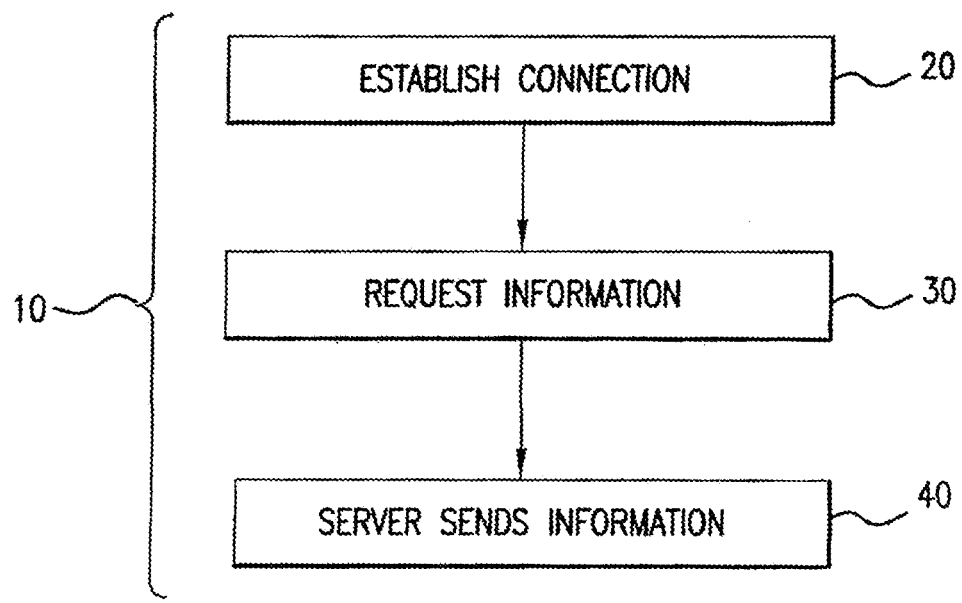
FIG. 1 is a flowchart illustrating a known method for transferring information over a distributed communication network.
Figure 2:
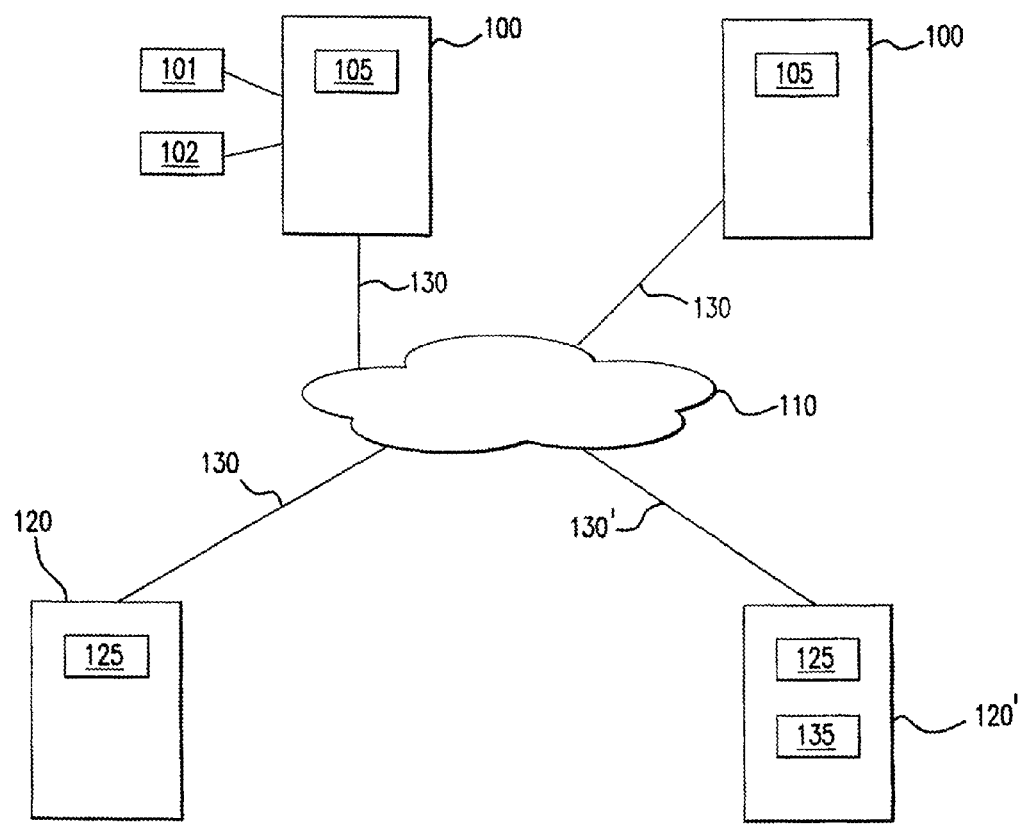
FIG. 2 is a schematic diagram of a distributed communication network used to implement the method of FIG. 1.

During the step 210, the text may come from various sources, as described above. In one embodiment, the text is manually entered by host personnel. However, as previously described, this method is time consuming and relatively expensive because of the labor involved. Therefore, in a preferred embodiment, the text is loaded automatically from a second website, as described above in FIGS. 1-2. It should be appreciated that similar techniques may be used to load text from one webpage to a second webpage at the same website. In this way, a website may re-employ useful text throughout a website, from one webpage to a second webpage.

Figure 3:
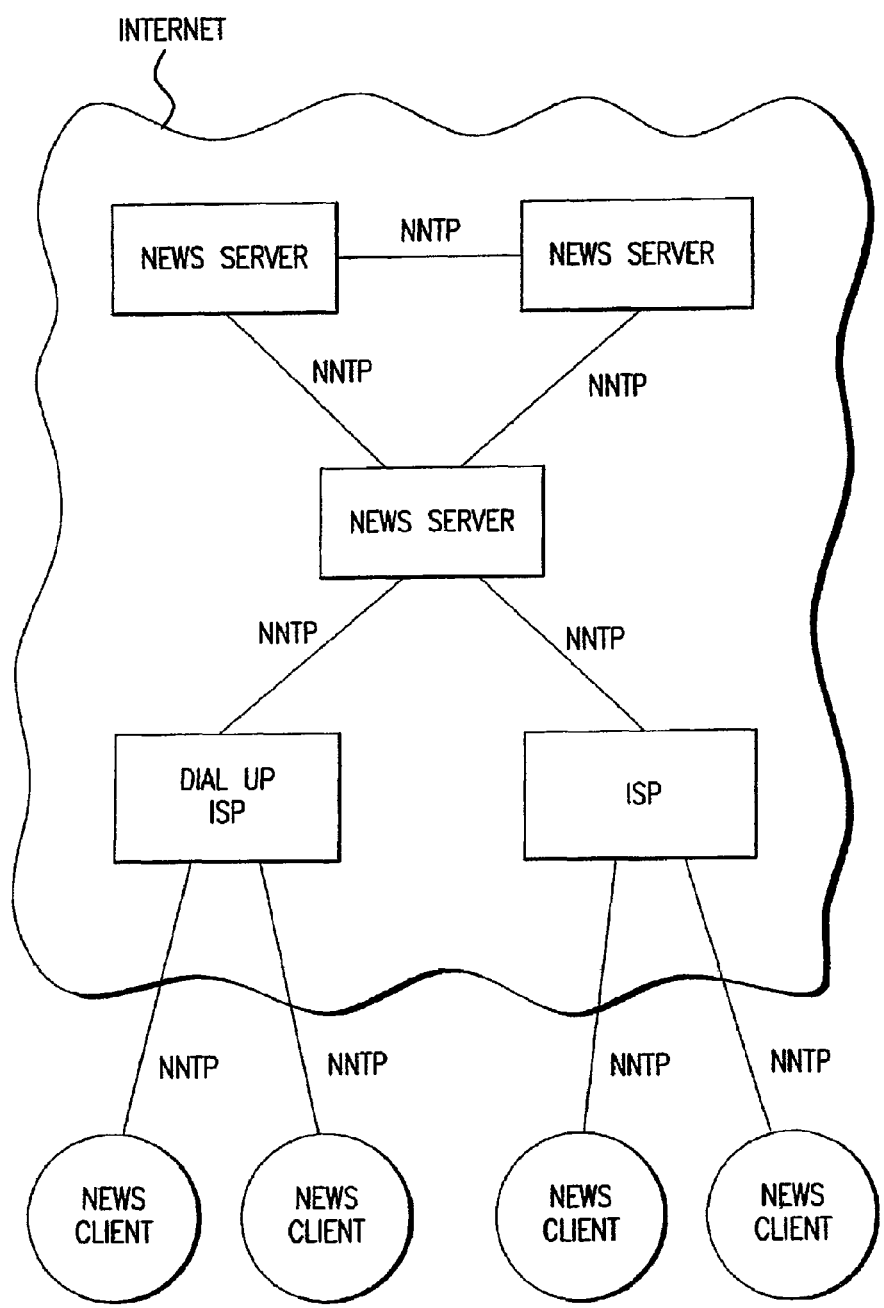
FIG. 3 is a schematic diagram of a news network.

In an alternative preferred embodiment, the text may be loaded from newsgroups articles during step 210. This process is described above and illustrated in FIG. 3. In this way, the site may adapt the publicly available articles, thus providing a considerable amount of content to the site without requiring extensive programming.

Once the text is loaded, the contents of the text are compared to character strings contained in a database, step 220. Each of the character strings has an associated hyperlink also contained in the database. An exemplary database is illustrated in the following table:

TABLE 1

| CHARACTER STRING | HYPERLINK |
| --- | --- |
| car | www.AcmeCar.com |
| cars | www.AcmeCar.com |
| Car | www.AcmeCar.com |
| CAR | www.AcmeCar.com |
| automobile | www.AcmeCar.com |
| Acme | www.AcmeCar.com |
| model | www.AcmeCar.com/go-car |
| Go-Car | www.AcmeCar.com/go-car |
| safety features | www.AcmeCar.com/safety |
| airbags | www.AcmeCar.com/safety |
| engine size | www.AcmeCar.com/engines |
| V-6 | www.AcmeCar.com/engines |

Table 1 contains hyperlinks to a hypothetical Acme Car Company that produces a model called the Go-Car. In general, the database will identify general terms for a concept (e.g., car, automobile, safety features, engine size) as well as specific terms and brand names (e.g., Acme, Go-Car, airbags, and V-6). The database can contain the character string in different cases (e.g., car, Car, Car). Similarly, the database my contain plural, singular forms of the same terms (e.g., car and cars). Each of the character strings is paired with an appropriate UPI. This pairing is predefined and can be readily changed according to the needs of the website.

While Table 1 shows a hierarchical database, it should be appreciated that many other forms of for databases are known and may be used. For example, a relational database may be used to store the character strings and the associated links.

In order to meet the needs of electronic commerce, the database should contain product names that may appear in the text. In particular, the database may include (1) common product identifiers ("CPIDs"), (2) a name defined by the host to identify a product ("shortname"); (3) full, formal name for a product; and/or (4) categories of products.

A shortname should be the most common name used to reference the product, while being as unique as possible. The shortname is often a subset of the full product name, and the same product may have more than one shortname. The use of the shortnames is advantageous because it allows an easy-to-use standard terminology for the same product that can be applied regardless of the language or format of the text. The host may coordinate with producers of text documents so that the producers of text consistently use the shortname for a product. This process helps increase the relevancy of the hyperlinks by reliably indicating a relation of the text to a product.

By using only the unique shortname to identify the products discussed in a text document, the number of character strings contained in the database may be reduced because the database would not need to contain every possible name for a product. By reducing the number of character strings, the amount of computations and the computational time required for step 220 may be greatly reduced.

In one embodiment, the links point to other webpages contained on the same website as the webpage displaying the text. In particular, the links may connect the users to webpages on the site related to products mentioned to the text. In this way, the website could direct the user from text related to a product to a webpage containing further information on the same product. Alternatively, a website may allow the user to purchase the mentioned item by linking the user to a webpage for placing an order.

In another embodiment, the relevancy of the links is improved by using secondary indicators of the subject matter of the text. For example, the host may look to the topic of a newsgroup or source site and use this information in the selection of relevant links. For example, the subject matter of the newsgroup may be used to limit the number of character strings. For example, when providing links to an article from a newsgroup related to cars, the host may search only character strings related to cars. Again, by limiting the numbers of character strings to be searched, the number of computations and the time for the computations in step 220 is reduced.

Then, in step 230, the relevant links are inserted into the contents of the webpage. For example, the hyperlink may appear as a symbol or banner adjacent to the text. The user then may select and activate the link by providing an input, such as a mouse click on the link.

In one preferred implementation, the hyperlinks appear in the contents of the text rather than at the periphery. The user therefore is exposed to the hyperlink white reading. The appearance of the identified character string is altered to indicate to the user that the character string is a hyperlink. Typically, after the character string is converted into a hyperlink, the character string is underlined. The character string may additionally be displayed in a different color to further differentiate the hyperlink from the remainder of the text. For example, if a user reads an article in a news forum about cars and the article contains the word "Acme," the present invention causes the word "Acme" as displayed within the text as a hyperlink to the Acme page. Because the links embedded in contextually relevant text, users are more likely to click to view the linked destination.

Figure 5:
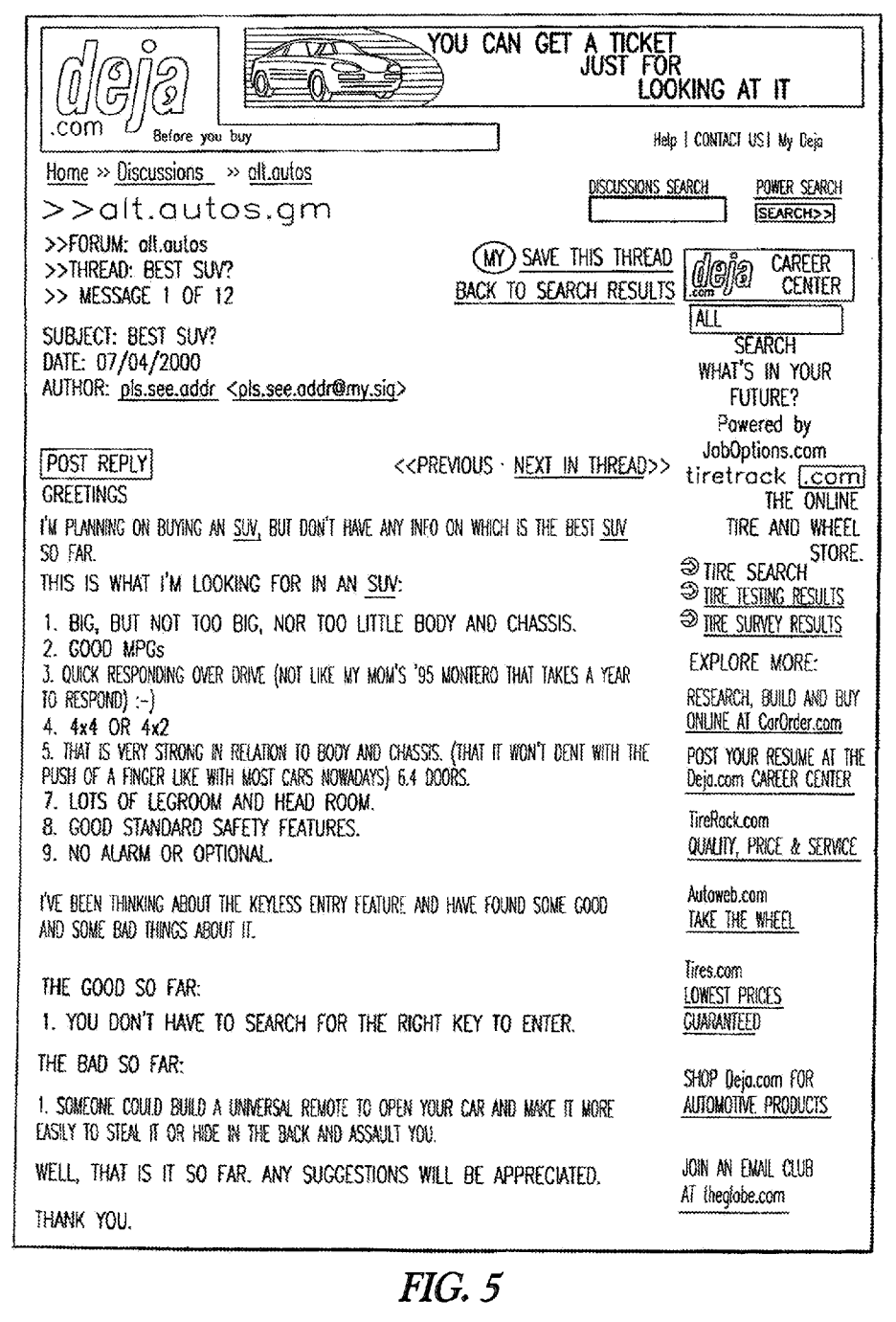

FIG. 5 illustrates a newsgroup article displayed in a website in which the term "SUV" has been converted into a hyperlink. As seen in FIG. 5, "SUV" appears bolded and underlined in the text to signify to the user that the term is a hyperlink to another document. FIG. 5 also illustrates how the periphery of text can contain further linked advertisements to related vendors. In particular, because the message concerns automobiles, the website contains advertisements to related topics such as models of cars or vendors of car parts and accessories.

As illustrated in FIG. 5, hyperlinks could also dynamically enable e-commerce textual content across the Internet by enabling other content sites, publishers, and aggregators to add these links to their textual content. These links could point either to the host site or to a co-branded or private labeled site. In particular, many sites contain large quantities of stored text. In order to better use the text, the website may wish to insert hyperlinks to related vendors. Every time a user connects from the site to a vendor, the vendor my pay the site a referral fee.

In a preferred implementation, only the first occurrence of a character string in the text is converted to a hyperlink. This method helps preserve the original appearance of the text and helps avoid the clutter caused by simultaneously displaying numerous links to the same location. Overall, the present invention seeks to avoid significantly reducing the appeal of the host site. For example, there should be a maximum 1% reduction in pageviews per session and maximum 1% increase in the abandonment rate (or "frustration rate").

Multiple insertions of the same link in a single text file may be avoided using any of several known techniques. For example, the site may be programmed to store a record of the character strings identified in the text and to add links only at the first instance of each character string. Alternatively, the database may be modified by removing a character string after the string is located in the text. In this way, only a single instance of the character string is identified.

In addition, the insertion of the hyperlink into the text should not disturb any existing HTML codes. Therefore, if the insertion of hyperlink at the initial location would disturb the HTML code used to form the webpage, the hyperlink should be added later in the text at a subsequent occurrence of the character string. Alternatively, the hyperlink may be positioned in the periphery of the text.

As described above, it is desirable to make the links as relevant as possible. With common product names, it is possible to mislink a string of text (i.e., provide a link leading to an unrelated product or concept). One way to decrease the likelihood of mislinking is to make the database search case sensitive (e.g., only match Windows®, not window). The database may be further adapted to allow for a list of stopwords (i.e. common words that should not be automatically linked) because the risk of mislinking of the stopwords is too high. In addition, the database may be designed such that certain character strings would not be linked even if portions of the character strings would normally be linked. For example, in the hypothetical example of Table 1, "car" may link to the Acme Car company site, but "Beta car" of a hypothetical rival Beta Car company should not link to the Acme site.

One concern with modifying text received from a third party is the risk of the possibility of copyright infringement. In particular, the links may be perceived as adding to an author's copyrighted work without the author's permission. This use for the text may fall outside of the host's implied license to use the text. One way to avoid such a possibility is to not change text to insert links when the author has indicated that modification is not permitted. For example, the contents of the text may contain an explicit prohibition against modification of the text contents. Similarly, Internet documents may contain a header that indicates the author does allow modification of the text. This is generally in the format of a "X-no-modify" header.

In another embodiment, the user may opt to receive only text and not the hyperlinks. This may be accomplished by displaying the original text document to the user.

Hypothetical Example 1

A user looks at the host site regularly to keep up with his newsgroup reading. While browsing the rec.arts.movies forums for anything on musicals, he notices that some of the movie titles are linked by being displayed in hypertext. He clicks one link, and he is taken to a webpage containing information about the musicals. As he continues to browse, he discovers that information on many other products are linked through the newsgroup articles.

Hypothetical Example 2

An author writes for a text-based, third-party site. The third-party site signs up with the host to commerce-enable all their text documents. The author sets up a feed that enables the host site to download the text from the third-party site. The host site inserts relevant hyperlinks into the text and provides the third-party host a list of the hyperlinks contained within each text document. If the third-party site indicates that it does wish to modify the appearance of the text by placing the links in-line with the contents of text, the links may be added to the periphery of the text.

The invention having been described, it will be apparent to those skilled in the art that the same may be varied in many ways without departing from the spirit and scope of the invention. Any and all such modifications are intended to be included within the scope of the following claims.

We claim:

1. A method for automatically inserting a hyperlink into a webpage containing text, the method comprising:
   receiving, via a network, the text;
   comparing a portion of the text to at least one character string that is stored in a database to identify the portion of the text as being included in both the webpage and the database, the portion of the text further being a name of a product and being associated with the hyperlink;
   causing an insertion of the hyperlink into the webpage; and
   communicating the name of the product to a producer of the text, the name of the product being included in the webpage by the producer of the text.

2. The method of claim 1, wherein the causing the insertion of the hyperlink into the webpage further includes causing an alteration of the portion of the text included in the text of the webpage.

3. The method of claim 2, wherein the causing the alteration of the portion of the text included in the text of the webpage includes causing the portion of the text to change colors to signify the portion of the text as the hyperlink.

4. The method of claim 1, wherein the causing the insertion of the hyperlink into the webpage includes causing an insertion of an advertisement into the webpage, wherein the advertisement includes the hyperlink.

5. The method of claim 4, wherein the causing the insertion of the advertisement includes causing an insertion of the advertisement into an area of the web page that is adjacent to the text at is included in the webpage.

6. The method of claim 4, wherein the advertisement is a banner.

7. The method of claim 1, wherein causing the insertion of the hyperlink into the webpage includes causing the insertion of the hyperlink into the webpage responsive to an identification of the first occurrence of the portion of text in the webpage.

8. The method of claim 1, wherein the causing he insertion of the hyperlink into the webpage includes causing the insertion of the hyperlink into the webpage at the periphery of the text.

9. The method of claim 1, further including determining a general topic of the text in the webpage and, wherein the at least one character string stored in the database is related to the general topic of the text in the webpage.

10. A system for automatically inserting a hyperlink into a webpage containing text, the system comprising:
    one or more processors;
    a database; and
    at least one software component, executed by the one or more processors, that is configured to receive, via a network, the text, the at least one software component is further configured to compare a portion of the text to at least one character string that is stored in a database to identify the portion of the text as included in both the webpage and the database, the portion of the text is a name of a product and is associated with the hyperlink, the at least one software component is further configured to cause an insertion of the hyperlink into the webpage and communicate the name of the product to a producer of the text, the name of the product is included in the webpage by the producer of the text.

11. The system of claim 10, wherein the at least one software component is configured to cause an alteration of the portion of the text included in the text of the webpage.

12. The system of claim 11, wherein the at least one software component is configured to cause the portion of the text to change colors to signify the portion of the text as the hyperlink.

13. The system of claim 10, wherein the at least one software component is configured to cause an insertion of an advertisement into the webpage, wherein the advertisement includes the hyperlink.

14. The system of claim 13, wherein the at least one software component is configured to cause an insertion of the advertisement into an area of the web page that is adjacent to the text that is included in the webpage.

15. The system of claim 13, wherein the advertisement is a banner.

16. The system of claim 10, wherein the at least one software component is configured to cause the insertion of the hyperlink into the webpage responsive to an identification of the first occurrence of the portion of text in the webpage.

17. The system of claim 10, wherein the at least one software component is configured to cause the insertion of the hyperlink into the webpage at the periphery of the text.

18. The system of claim 10, wherein the at least one software component is configured to determine a general topic of the text in the webpage and wherein the at least one character string stored in the database is related to the general topic of the text in the webpage.

\* \* \* \* \*